Jan. 20, 1953  W. R. GREEN ET AL  2,625,964
HAND BAND SAW
Filed March 1, 1950  2 SHEETS—SHEET 1
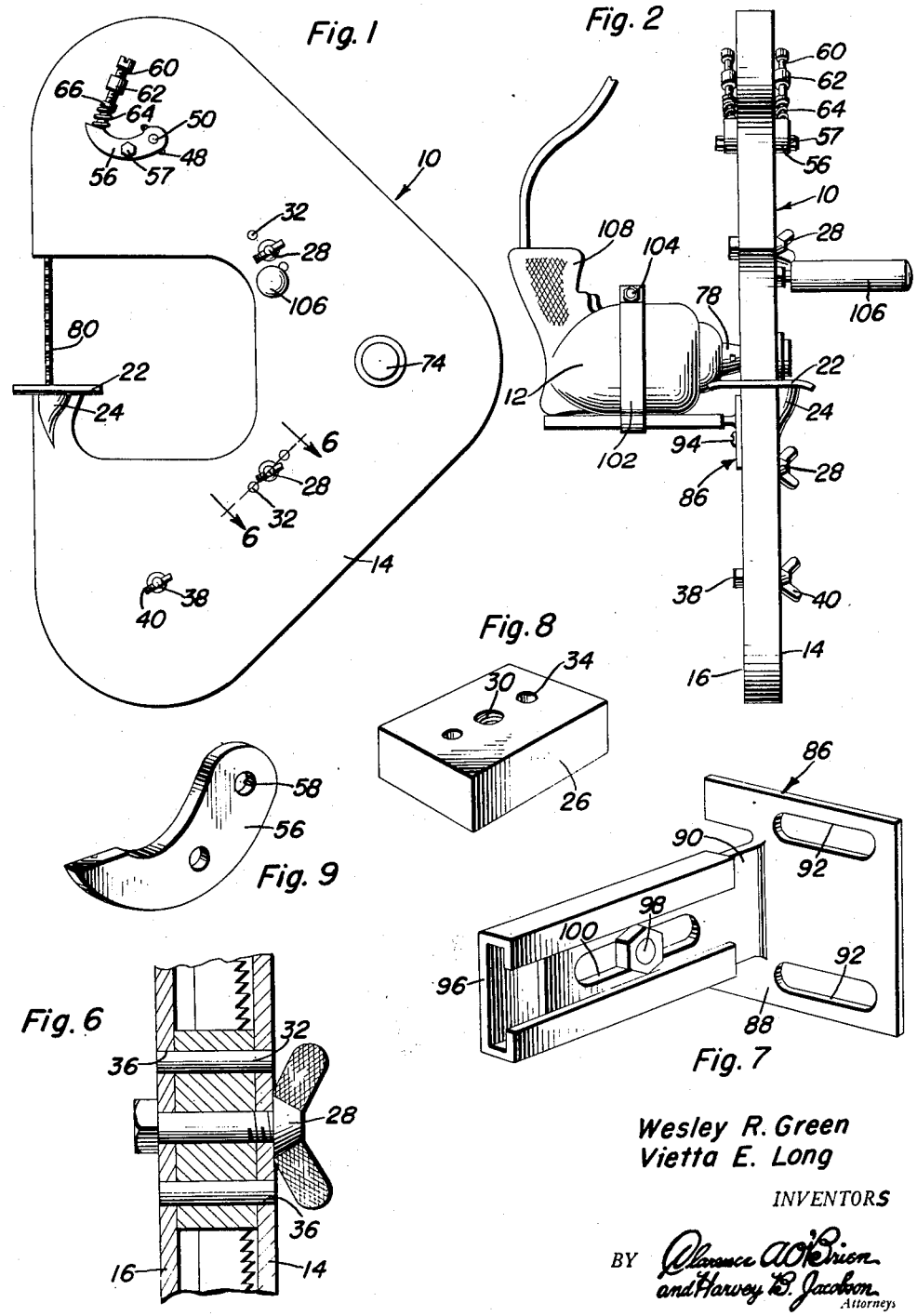
Wesley R. Green
Vietta E. Long
INVENTORS Jan. 20, 1953  W. R. GREEN ET AL  2,625,964
HAND BAND SAW
Filed March 1, 1950  2 SHEETS—SHEET 2
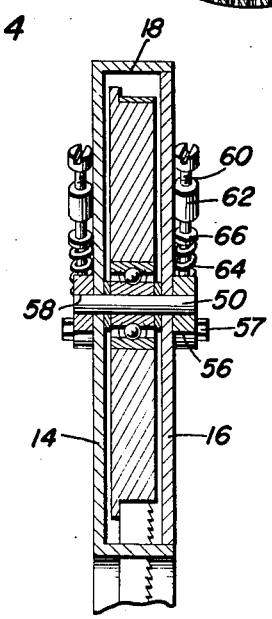
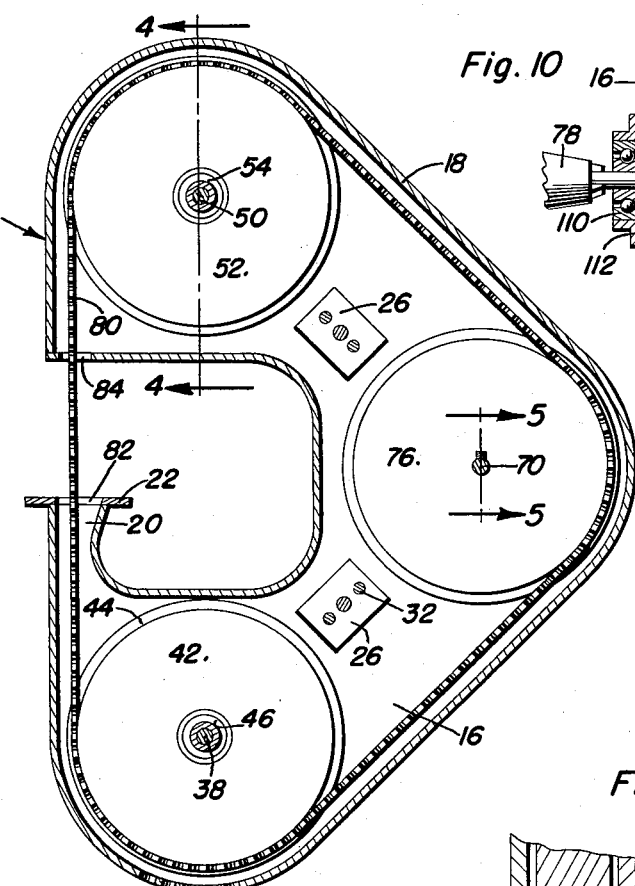
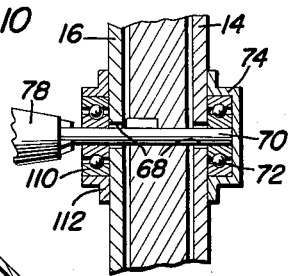
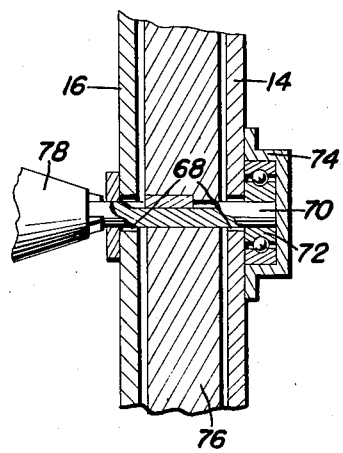
Wesley R. Green
Vietta E. Long
INVENTORS
BY Clarence A. O'Brien
and Harvey B. Jacobson
Attorneys Patented Jan. 20, 1953

2,625,964

UNITED STATES PATENT OFFICE 2,625,964

HAND BAND SAW

Wesley R. Green, Los Angeles, and Vietta E. Long, Inglewood, Calif.

Application March 1, 1950, Serial No. 147,096

2 Claims. (Cl. 143—21)

This invention comprises novel and useful improvements in band saws, and more particularly pertains to portable band saws.

The various important objects of this invention are to provide a band saw which is light weight and portable; which is of simple construction yet highly efficient for the purposes intended.

An important feature of this invention resides in the provision of a pair of combined saw shielding and wheel supporting plates.

Another feature of this invention resides in the provision of a pair of plates, in accordance with the foregoing feature, together with a novel means for detachably retaining the plates in registering parallel spaced relation to each other.

A further feature of this invention resides in the provision of a drive shaft which is rotatably journaled in one of the plates, and which is supported and driven by a motor axially of the shaft in such a manner that alignment of the drive wheel can be accomplished by adjusting the motor mount.

These, together with various ancillary objects and features, are attained by this device, a preferred embodiment of which is illustrated by way of example only in the accompanying drawings, wherein:

Figure 1 is a side elevational view of the portable band saw;

Figure 2 is a front elevational view of the portable band saw, with the saw blade removed therefrom;

Figure 3 is a longitudinal sectional view of the band saw showing the positioning of the wheels;

Figure 4 is a fragmentary transverse sectional view taken substantially on the plane of the line 4—4 of Figure 3;

Figure 5 is a fragmentary transverse sectional view of the motor connection to the drive shaft taken on the plane 5—5 of Figure 3;

Figure 6 (sheet 2) is a fragmentary transverse sectional view of the spacing block taken on the plane 6—6 of Figure 1;

Figure 7 is a perspective detail view of the motor mount;

Figure 8 is a perspective detail view of the spacing block;

Figure 9 is a perspective detail view of one of the wheel adjusting arms; and

Figure 10 (sheet 2) is a fragmentary detail view of a modification of Figure 5.

Referring now more specifically to the accompanying drawings wherein like numerals designate similar parts throughout the various views, it will be readily seen that there is provided a portable band saw indicated generally by the numeral 10 which is adapted to be driven by a conventional electric drill motor 12, or the like.

The band saw 10 consists generally of a pair of C-shaped plates 14 and 16, one of which plates 14 has provided thereon, and preferably integrally therewith, a peripheral flange 18. The lower arm of the C-shaped plates may conveniently be provided with an upstanding portion 20 which extends towards the upper arm of the plates, and which upstanding portion has attached thereto a work supporting shelf 22. Obviously, the shelf 22 may be either rigidly attached to the upstanding portion 20 of the plates 14 and 16 and suitably anchored as by the member 24, or alternatively the shelf may be angularly adjustably attached to the plates.

It is intended that the plate 16 be snugly receivable within the peripheral flange 18 so as to positively align the plates 14 and 16 with each other. Spacing blocks 26 are detachably secured between the plates as by the fasteners 28 which may conveniently consist of bolts each of which extend through the plates and through the bore 30 in the block, and which fasten the plates to the block by a wing nut or the like. In order to further insure the proper alignment of the plates 14 and 16, the blocks may be provided with guide pins 32 which are preferably press-fitted into bores 34 in the block and extend therethrough, the extended ends being received in corresponding bores 36 in the plates 14 and 16.

A headed lower stub shaft 38 extends transversely of the lower arm of the C-shaped plates, and is detachably secured to the plates as by the locking nut 40. A lower blade guide wheel 42 having a peripheral flange 44 thereon is rotatably mounted on the lower stub shaft 38 as by antifriction bearings 46. The upper arm of the C-shaped plates are provided with registering arcuate slots 48, which slots slidably receive an upper stub shaft 50 upon which is also rotatably journaled as by bearing 54 a flanged upper guide wheel 52.

The upper stub shaft is adjustably reciprocated in the slots 48 as by the arms 56 which are pivoted intermediate their ends to the plates 14 and 16 as by bolts 57. The arms 56 have bores 58 on one end thereof for detachably receiving the upper stub shaft 50. Adjusting screws 60 are screw-threadedly received in the internally threaded sleeves 62 and are selectively engageable with the other ends of the arms 56. In order that a resilient pressure may be applied, a suitable coil spring 64 may be mounted axially of the adjusting screws, a flange 66 being secured to the screws to urge the spring into engagement with the arms. Obviously, the flange 66 may be screw-threadedly received on the adjusting screw to permit the tension on the spring to be adjusted.

Transverse axially aligned bores extend through the mid-section of the C-shaped plates 14 and 16, which bores loosely receive a drive shaft 70. One of the plates such as 14 has mounted thereon axially of the bores 68, a bearing 72, which bearing is retained in place as by the cup-shaped member 74 that is screwed, welded or otherwise secured to the plate 14.

Keyed or otherwise non-rotatably secured to the drive shaft 70 is a drive wheel 76. The non-journaled end of the drive shaft 70 is received within, and drivingly engaged by the chuck 78 of the power drill 12. Encircling the guide wheels and the drive wheel is an endless band saw blade 80, and for this purpose the shelf 22 and the peripheral flange 18 are suitably apertured as at 82 and 84 respectively to permit the saw blade to pass therethrough.

The power drill 12 is mounted on the band saw in axial alignment with the drive shaft 70 by means of an L-shaped bracket 86 having vertical and horizontal arms 88 and 90, respectively. The vertical arm 88 is slotted as at 92, and is secured to the plate 16 by means of headed screws or bolts 94 which slidably extend through the slots. The horizontal arm of the bracket 86 may be made longitudinally expansible so as to accommodate different sizes and types of drill motors, by providing a channel-shaped member 96 which slidably receives the horizontal arm, and is selectively locked thereto by means of a fastener 98 which is slidably received in the slot 100 in the horizontal arm.

The drill motor is detachably secured to the bracket 86 by means of a band 102 which underlies the horizontal arm 90 and embraces the body of the drill motor, a suitable adjusting bolt 104 joining the ends of the band.

A handle 106 is attached to the plate 14 in any desired manner such as by bolts or the like, which handle in conjunction with the drill motor handle 108 provide a ready means for manipulating the portable drill press in any desired direction.

As will be readily apparent from a consideration of the drawings, the drill motor 12 serves as a bearing for one end of the drive shaft 70, and is so mounted on the band saw 10 by the adjustable bracket 86 that any misalignment in the drive shaft 70 may be readily corrected by adjustment of the bracket relative to the aligned bores 68. Either vertical or lateral movement of the drill motor may be accomplished by respectively reciprocating arm 88 relative to the screws 94, or pivoting the arm 88 about either of the screws 94, sufficient clearance being provided between the slots 92 and the bolts 94 to permit such movement.

In the alternative construction shown in Figure 10 of the drawings, a second anti-friction bearing 110 is secured to the plate 16, coaxially of the bore 68 therein, by means of an annular flanged sleeve 112. The bearing 110 obviously rotatably receives the drive shaft 70.

From the foregoing, it is thought the operation and construction of the device will be readily understood, and further discussion is believed to be unnecessary. However, since numerous modifications will readily occur to those skilled in the art after a consideration of the foregoing specification and accompanying drawings, it is not intended to limit the invention to that shown and described, but all suitable modifications may be resorted to falling with the scope of the appended claims.

Having described the invention, what is claimed as new is:

1. A portable band saw comprising a pair of C-shaped wheel supporting plates, a peripheral flange on one of said plates, the other of said plates being guidingly received within said flange, spacing blocks mounted between said plates, locking pins carried by said blocks, said plates having apertures therein for receiving said pins, locking bolts each extending through said plates and one of said blocks for detachably securing said plates to said blocks, a pair of stub axles detachably secured to said plates, guide wheels on said axles between said plates, saw means entrained over said guide wheels, and means for driving said saw means.

2. In a band saw, a pair of C-shaped plates, means connecting said plates together in laterally spaced relation, shafts extending transversely through said plates, guide wheels on said shafts between said plates, a band saw trained around said wheels, a motor having a shaft operatively connected to one of the first-named shafts, and means supporting said motor for adjustment transversely and longitudinally of said one shaft comprising an angle bracket having a pair of arms with slots in one arm and bolted through said slots to one of said plates for adjustment transversely of said one shaft, a channel member on the arm of said brackets slidably adjustable thereon longitudinally of said one shaft, means to retain said channel member in adjusted position, and a clamp surrounding said motor and channel member and securing the same together.

WESLEY R. GREEN.
VIETTA E. LONG.

REFERENCES CITED

The following references are of record in the file of this patent:

UNITED STATES PATENTS

| Number | Name | Date |
| --- | --- | --- |
| 1,499,124 | Reichmann | June 24, 1924 |
| 1,721,722 | Wells | July 23, 1929 |
| 1,808,228 | Hulack et al. | June 2, 1931 |
| 1,825,164 | Skillman | Sept. 29, 1931 |
| 1,848,300 | Avilla | Mar. 8, 1932 |
| 1,879,145 | Erickson | Sept. 27, 1932 |
| 1,967,724 | Ponton | July 24, 1934 |

FOREIGN PATENTS

| Number | Country | Date |
| --- | --- | --- |
| 718,009 | France | Oct. 26, 1931 |
| 549,162 | Germany | May 3, 1934 |
| 571,249 | Germany | Aug. 7, 1934 |